United States Patent [19]

Booij

[11] Patent Number: 4,756,769
[45] Date of Patent: Jul. 12, 1988

[54] METHOD FOR CLEANING WITH HIGH PRESSURE AN EVAPORATOR AND DEVICE USED THEREBY

[75] Inventor: Johannes Booij, Rhoon, Netherlands

[73] Assignee: Innus Industrial Nuclear Services S.A., Geneva, Switzerland

[21] Appl. No.: 4,245

[22] Filed: Jan. 5, 1987

Related U.S. Application Data

[63] Continuation of Ser. No. 653,852, Sep. 24, 1984, abandoned.

[30] Foreign Application Priority Data

Jan. 27, 1984 [BE] Belgium .................. 2/60322

[51] Int. Cl.⁴ .............................................. B08B 9/00
[52] U.S. Cl. .................................. 134/22.18; 134/24; 134/167 R; 134/169 R; 122/390; 122/391; 122/392
[58] Field of Search ............... 134/10, 22.18, 21, 24, 134/167 R, 169 R; 252/600; 122/382, 38, 390, 391, 392; 15/316 A, 316 R

[56] References Cited

U.S. PATENT DOCUMENTS

| 3,024,134 | 3/1962 | Schlott | 134/10 |
| 3,311,092 | 3/1967 | McMahlon et al. | 122/392 |
| 4,079,701 | 3/1978 | Hickman et al. | 122/382 |
| 4,273,076 | 6/1981 | Lahoda et al. | 15/316 R |
| 4,424,769 | 1/1984 | Charamathieu et al. | 122/391 |
| 4,452,183 | 6/1984 | Yazidjian | 122/392 |
| 4,565,206 | 1/1986 | Booij | 15/316 |
| 4,653,435 | 3/1987 | Lebouc | 122/382 |

FOREIGN PATENT DOCUMENTS

2289850  5/1976  France .

OTHER PUBLICATIONS

English translation of claim 1 of FR-A-2.289.850 (Bettella).

Primary Examiner—Helen M. S. Sneed
Assistant Examiner—Sharon T. Cohen
Attorney, Agent, or Firm—Burns, Doane, Swecker & Mathis

[57] ABSTRACT

The spaces into which the vessel is divided by means of horizontal perforated partions are successively cleaned from top to bottom. Firstly the uppermost space is cleaned: the cover of the access to the space is removed, through the access a high-pressure lance is equipped with a spray head comprising a body rotatable about the lance axis and spray arms rotatably mounted on said body and liquid is sprayed with a pressure lying between 35 and 50 MPa. Then the middle space is cleaned: the cover of the access to the space is removed, through the access a high-pressure lance is equipped with a fixed spray head provided with spray openings directed in various directions and liquid is sprayed with a pressure lying between 50 to 70 MPa. Finally the lowermost space is cleaned in the same way as the uppermost space. The cleaning liquid is discharged through the outlet in the vessel bottom.

8 Claims, 4 Drawing Sheets

METHOD FOR CLEANING WITH HIGH PRESSURE AN EVAPORATOR AND DEVICE USED THEREBY

This application is a continuation of application Ser. No. 653,852, filed Sept. 24, 1984, now abandoned.

BACKGROUND OF THE INVENTION

This invention relates to a method for cleaning with high pressure an evaporator of that type which comprises an upstanding, round, closed vessel, at least two substantially horizontal perforated partitions which divide said vessel into an uppermost space, at least one middle space, and a lowermost space, a supply line for the liquid to be evaporated which line opens on the uppermost space, an access to said uppermost space which access is provided in the vessel wall and is closable with a cover, an access to said middle space which access is provided in the vessel wall and is closable with a cover, a discharge line for the vapour and possibly some liquid, which line opens on the lowermost space, an outlet which is provided in the vessel bottom, and an access to said lowermost space which access is provided in the vessel bottom and is closable with a cover.

Evaporators of the above-defined type are used in nuclear power stations for treating all of the leak water which is considered as possibly containing radio-active particles.

Such evaporators are notably marketed by the French Company "Stein Industrie" from Vélizy Villacoublay.

Leak water which might possibly contain radio-active particles, is first pre-heated in a heater, and thereafter fed at the top to the evaporator of the above-defined type. Inside said evaporator, said leak water first flows through a separating filter and then in counter-current with added steam, through a number, generally three, horizontal perforated partitions. The major portion of the leak water evaporates and the possible radio-active particles which are not retained by the filter, remain after the evaporating. The vapour being formed is then condensated inside a condensor into water with a substantially lower radio-active degree of contamination as the original leak water.

A large portion of those radio-active particles which remain inside the evaporator collect at the bottom of the vessel and are discharged through the outlet in the vessel bottom. A portion of radio-active particles does however remain in the lime settling which, as in every evaporator, occurs on the inner side of the vessel.

Due to such lime settling or deposit, the small holes in the perforated partitions are progressively sealed, so that after some time, the good operation of the evaporator is hampered.

In the known evaporators, no special provisions are made to oppose such sealing of the small holes in the perforated partitions, nor to remove the lime deposit, so that cleaning of the spaces inside the evaporator is required from time to time.

Such cleaning which has to occur through those existing accesses which are closed with a cover during the normal working of the evaporator, to the spaces, does bring particular problems due to the lack of space around the evaporator and mostly due to the fact that such evaporator has a strong radio-active contamination.

The cleaning has thus to be made by a worker who bears protective clothing from outside the evaporator, in as simple, fast and effective way as possible.

The invention has for object to provide such a method for cleaning with high pressure an evaporator of the above-defined type, which method allows, in spite of the difficult accessibility of the evaporator inner spaces, to clean very efficiently said inner spaces in a fast and simple way.

THE INVENTION

For this purpose, the uppermost space is first cleaned, then the middle space and finally the lowermost space, whereby for cleaning the uppermost space, the cover of the access to said space is removed, through said access a high-pressure lance is brought-in with at the one end thereof, a spray head comprising a body rotatable about the lance axis and rotatable spray arms mounted on said body, and liquid is sprayed with a pressure lying between 35 and 50 MPa, for cleaning the middle space, the cover of the access to said space is removed, through said access is brought-in a high-pressure lance with at the one end thereof, a fixed spray head provided with spray openings directed in various directions, and liquid with a pressure lying between 50 and 70 MPa is sprayed through the spray head in said space, for cleaning the lowermost space the cover of the access to said space is removed, a high-pressure lance with at the one end thereof a spray head which is similar to the one used for cleaning the uppermost space, is brought-in through said access in said lowermost space, while insuring that the access is sealed leakfree around the lance, and liquid under a pressure lying between 35 and 50 MPa is sprayed through the spray head, and during the cleaning of each one of said spaces, the cleaning liquid is collected at the vessel bottom and discharged through the outlet in said bottom.

In a particular embodiment of the invention, the collected cleaning liquid is pumped through the bottom outlet away to a filter unit and said liquid after filtering is used again for the cleaning.

In said embodiment, a minimum amount of cleaning liquid, generally water, is required.

In that case where the evaporator comprises three substantially horizontal perforated partitions and consequently two middle spaces and in a remarkable embodiment of the invention, both said middle spaces are cleaned in the same way, starting with the uppermost one.

In a preferred embodiment of the invention, during the cleaning of the middle space, the spray head is moved during spraying to-and-fro substantially horizontally along the lance axis.

During the cleaning of the uppermost and/or lowermost space, the spray head is preferably retained in a fixed location during the spraying.

Usefully the spraying may thereby be repeated in various positions of the spray head in the corresponding space.

The invention also relates to a device obviously intended to be used for applying the method according to any one of the above embodiments.

The invention thus relates to a device the feature of which lies in that it comprises at least one high-pressure lance, at least one first spray head with a body, which can be rotatably mounted about the lance axis on said lance, and with spray arms, which are rotatably mounted on said body about an axis at right angle to said lance axis, the device further comprising a spray head with spray openings directed in various directions which head can be fixedly mounted on the high-pressure lance, at least one sealing passageway for the lance and means for feeding cleaning liquid to the spray heads with a pressure lying between 35 and 50 MPa for cleaning the uppermost and lowermost spaces of the evaporator and between 50 and 70 MPa for cleaning the middle space.

Usefully the device comprises a passageway which has a flange which fits on the access to the uppermost space of the evaporator, a ball fitting mounted in said flange which is provided with a passage for the high-pressure lance, whereon the rotatable spray head can be mounted, so that the lance with said rotatably spray head can be directed in all directions inside the uppermost space.

In a preferred embodiment of the invention, said device comprises an apparatus for moving to-and-fro over a limited distance the lance whereon the fixed spray head can be mounted for cleaning the middle space.

Other features and advantages of the invention will stand out from the following description of a method for cleaning with high pressure an evaporator and of a device used thereby, according to the invention; this description is only given by way of example and does not limit the invention; the reference numerals pertain to the accompanying drawings.

DRAWINGS

In the various figures, the same reference numerals pertain to the same elements.

DESCRIPTION OF A PREFERRED EMBODIMENT

Figure 1:
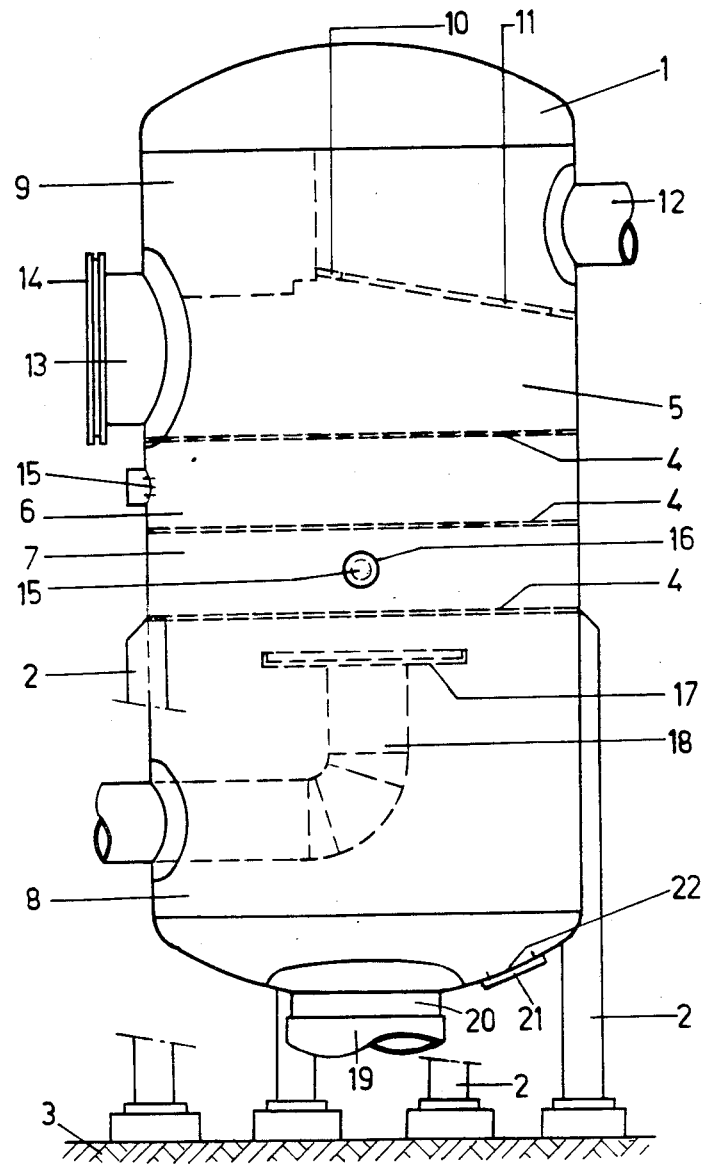
FIG. 1 is a front view of an evaporator of that type which can be cleaned according to the method according to the invention and with the device according to the invention, shown during the normal operation thereof.

The evaporator according to FIG. 1 is an evaporator from a nuclear power station, for treating the leak water which might possibly contain radio-active particles. Said evaporator is known as such. Such an evaporator is manufactured by the French Company "Stein Industrie" and is notably used in the French nuclear power stations in Tricastin, Dampierre and Gravelines.

Said evaporator comprises a round upstanding closed vessel 1, which bears with four legs 2 on ground 3 and which is divided by three horizontal partitions 4, perforated with small round holes with a diameter of four millimeters, into an uppermost space 5, two middle spaces 6 and 7 located above one another with a short height, and a lowermost space 8.

The uppermost space 5 is in turn further divided in two by a filter 9 and a slanting partition 10,11 which closes-off the opening around filter 9 and comprises a removable part 11.

Above said partition 10,11, there opens into said uppermost space 5 the feed line 12 through which the leak water, pre-heated in a heater, is fed to the evaporator.

There is provided diametrically-opposite the opening of feed line 12, in the wall of vessel 1, an access 13 to space 5, which access is closed by a cover 14.

Half-way up the height thereof, each middle space 6 or 7 is provided with an access 15 which is closed by a cover 16. Said round access 15 provided in the wall of vessel 1 has a very small inner diameter, namely a diameter of but 27 mm. The accesses 15 to both spaces 6 and 7 are staggered over 90° relative to one another about the vessel axis.

Underneath the lowermost partition 4, a receiving tray 17 is mounted on the end of a discharge line 18. Said discharge line makes a 90°-turn and leaves radially the vessel. The vapour being formed is discharged from the lowermost space 8 through said discharge line to a condensor.

The remaining water and sludge which collect at the bottom of lowermost space 8, are pumped away through the line 19 which connects to the outlet 20 provided in the center of the bottom of vessel 1.

Next to outlet 20, an access 22 closed with a cover 21, to the lowermost space 8, is provided with a diameter of ten centimeters.

After stopping the operation of the evaporator and consequently stopping the supply of leak water, the various spaces 5,6,7 and 8 are cleaned succeedingly from top to bottom in the following way.

Figure 2:
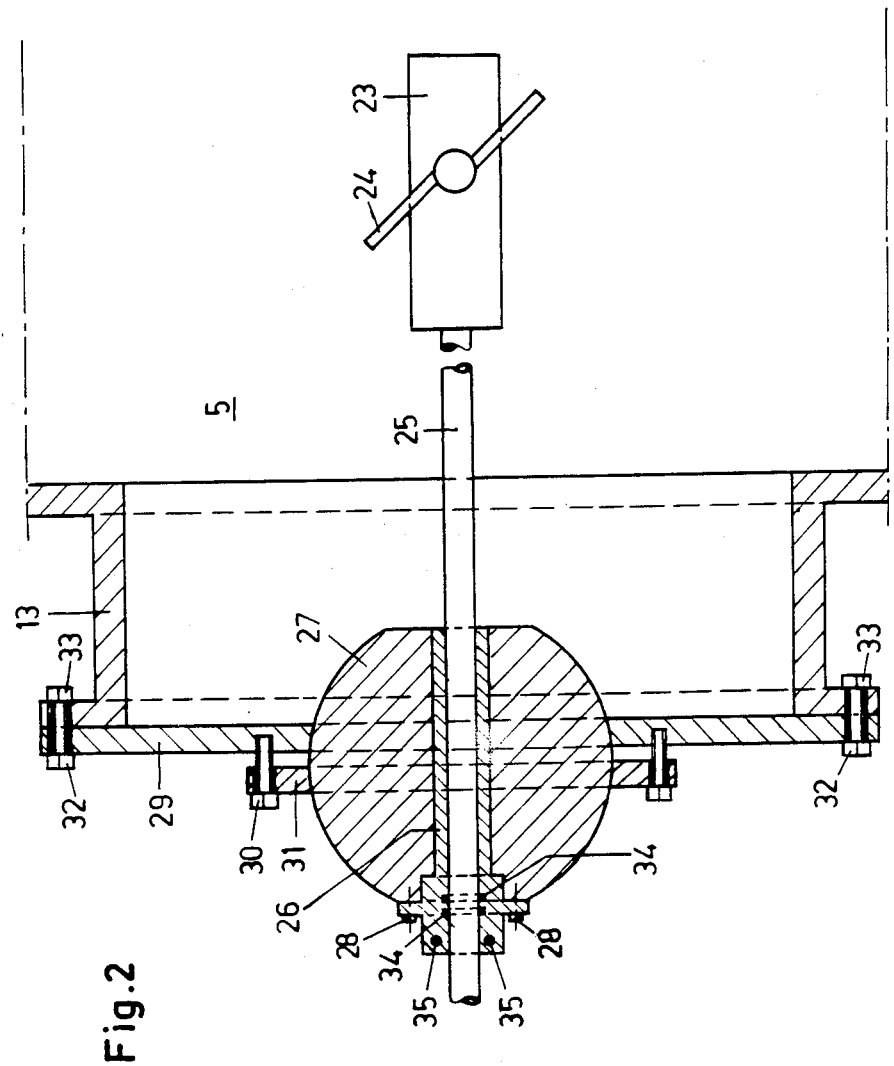
FIG. 2 shows a lengthwise section of that portion of the device according to the invention which is used for cleaning the uppermost space of the evaporator, which portion is shown during the cleaning and thus mounted on part of the evaporator, shown on a larger scale as in FIG. 1.

First the cover 14 and the removable part 11 of partition 10,11 are removed. Through the access 13, there is brought in the uppermost space 5, a so-called rotating tank washing head 23,24 mounted on a high-pressure lance 25 as shown in FIG. 2. Said tank washing head 23,24 is of a structure known per se and will only be described hereinafter as far as necessary for making the invention clear. Said head comprises an oblong body 23 in the shape of a cylinder flattened on one side which cylinder lies with the axis thereof in the extension of the lance axis. Said body 23 is rotatably about the lance axis. Along the flattened side, two spray arms 24 are mounted in parallel relationship with one another and with the flattened side, on the body 23, rotatably about one and the same axis at right angle to the flattened side and thus also at right angle to the lance axis. Such a tank washing head is marketed by the firm URACA under the name TWK 9-400.

The lance has an outer diameter of 30 mm and extends through a bush 26 which extends in turn through a ball 27 and it is secured to said ball by bolts 28.

The ball 27 is received between a mounting flange 29 and a clamping flange 31 secured thereon by bolts 30.

The ball 27 may be clamped in position by tightening the bolts 30.

As it appears from FIG. 2, the mounting flange 29 fits on the flange of the access 13 whereon the cover 14 was mounted, and said mounting flange is secured with bolts 32 and nuts 33 in the same way as the cover on access 13.

By tightening the bolts 30, the ball 27 is made fast in the required position. As said ball is pressed against the mounting flange 29, no water can leak between ball 27 and said flange 29. Leaking of water between bush 26 and lance 25 is prevented by O-rings 34 mounted in bush 26.

The outermost end of bush 26 projecting outside ball 27, forms a clamping ring which is clamped with clamping bolts 35 around lance 25. The high-pressure lance 25 is made fast thereby relative to bush 26, in such a way that said lance is no more slidable along the axis thereof.

It is clear that the above-described lead-through 26-35 for the lance through access 13 allows as well adjusting the direction of lance 25 by rotating said ball 27, as moving the lance 25 along the lengthwise axis thereof by shifting same relative to bush 26, so that the tank washing head 23,24 may be brought in various locations inside space 5.

That end of said high-pressure lance 25 lying outside vessel 1 is connected to a supply line for water with a pressure lying between 35 and 50 MPa, and preferably equal to 40 MPa.

Due to the pressure, the arms 24 and body 23 of the tank washing head 23,24 rotate automatically.

In various positions of said head 23,24, the complete inner side of space 5 is sprayed succeedingly, whereby every time before spraying with water at the above-defined pressure, the high-pressure lance 25 is made fast in the lead-through 26-35, in such a way that the head 23,24 cannot change position during the spraying.

Figure 3:
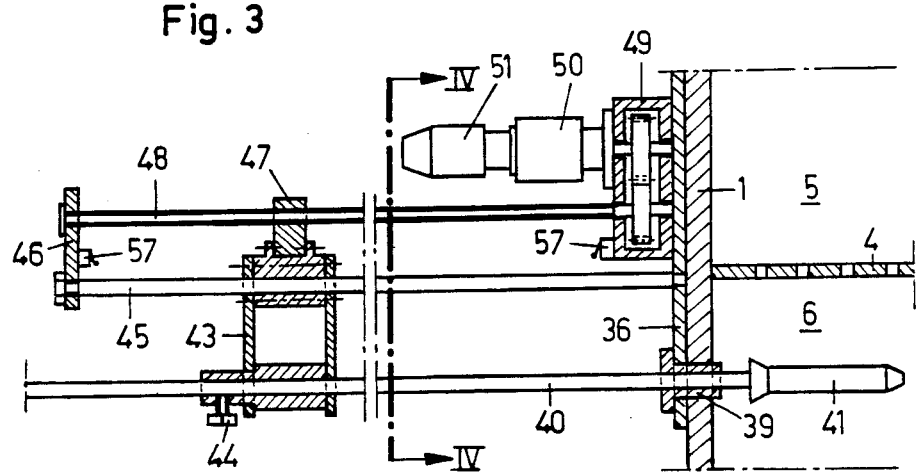
FIG. 3 shows a lengthwise section similar to the one in FIG. 2, but of that portion of the device which is used for cleaning a middle space, which portion is shown as mounted on another part of the evaporator during the cleaning of said middle space.
Figure 4:
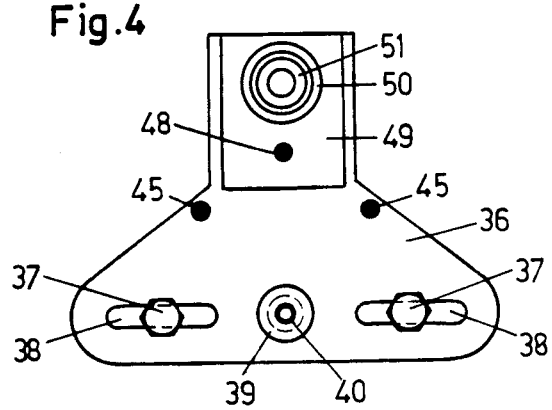
FIG. 4 shows a cross-section of the portion of the device shown in FIG. 3, taken along the plane shown by line III—III in FIG. 3.
Figure 5:
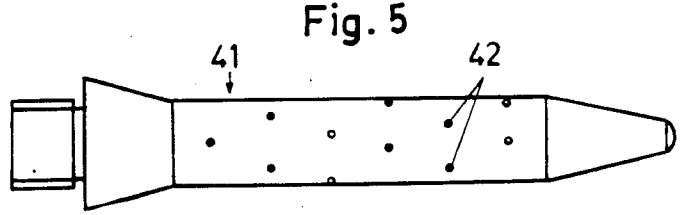
FIG. 5 is a side view of the spray head from that portion of the device as shown in FIGS. 3 and 4, but drawn on a larger scale.

The upper middle space 6 and the lower middle space 7 are then succeedingly cleaned in similar ways by means of the apparatus as shown in FIGS. 3 to 5.

The cover 16 on the access 15 to space 6 or 7 respectively is first removed and in lieu thereof the mounting flange 36 is secured by means of two bolts 37 which are screwed into the vessel 1 through slots 38 intended thereof in flange 36, in such a way that a bush 39 mounted in said mounting flange 36 fits with an end projecting outside the flange in said access 15.

Said bush 39 forms a guide for a high-pressure lance 40 which bears on the end thereof lying inside the middle space 6 or 7, a fixed spray head 41, and which is supported outside said space 6 or 7 by a mechanism for moving said lance to-and-fro along the axis thereof.

The spray head 41 which is shown in detail in FIG. 5, comprises mainly an oblong hollow round body which extends in the extension of said high-pressure lance 40 and the outer side of which opens with six rows of six small holes 42 on the outer circumference thereof. Said six rows lie in various planes directed cross-wise to the body axis and equally spaced from one another, and the small holes 42 from each row are distributed evenly with the mouth thereof over the body circumference. The holes are not bored radially but somewhat tangentially and are directed outwards in the opposite direction to that direction in which the spray head 41 is screwed on lance 40. The small holes have a diameter of 0.8 mm.

The high-pressure lance 40 has an outer diameter of 21.5 mm.

Said lance is supported outside vessel 1 by a carriage 43 to which it is moreover removably secured by means of a bolt 44. The carriage 43 is slidable to-and-fro over two guide rods 45 which extend in parallel relationship with the lance axis, at right angle to the mounting flange 36, and said rods are secured with one end to said flange 36 and they are connected with the other end to a connecting plate 46. To the top of the carriage 43 is secured a catch block 47 provided with an inner screwthread, which is screwed on a threaded shaft 48. Said threaded shaft 48 extends in parallel relationship with the guide rods 45 between the mounting flange 36 and the connecting plate 46, and it is driven through a gear-box 49 mounted on said mounting flange 36 and a reductor 50, by an air motor 51. Due to the revolution of the threaded shaft 48, the carriage 43 and consequently the lance 40 secured thereon, is moved. The maximum displacement of carriage 43 is thirty centimeters. At the end of the stroke thereof, the carriage operates a valve 57 which reverses the revolution direction of air motor 51 and thus of the threaded rod 48. The carriage 43 moves thereby automatically to-and-fro.

To said high-pressure lance 40 is connected a supply line for water with a pressure lying between 50 and 70 MPa, and preferably equal to 60 MPa. The lance 40 is brought as far as possible inside space 6 or 7, it is made fast to carriage 43 in the position thereof as close as possible to vessel 1 and spraying is performed with the above-defined pressure. The lance 40 with spray head 41 is caused to move over thirty centimeters to-and-fro until the corresponding portion of space 6 or 7 is cleaned. The lance 40 is then released from carriage 43, it is shifted thirty centimeters outwards, it is made fast again to carriage 43 and spraying is performed anew. One proceeds in this way until the complete space 6 or 7 has been cleaned.

Figure 6:
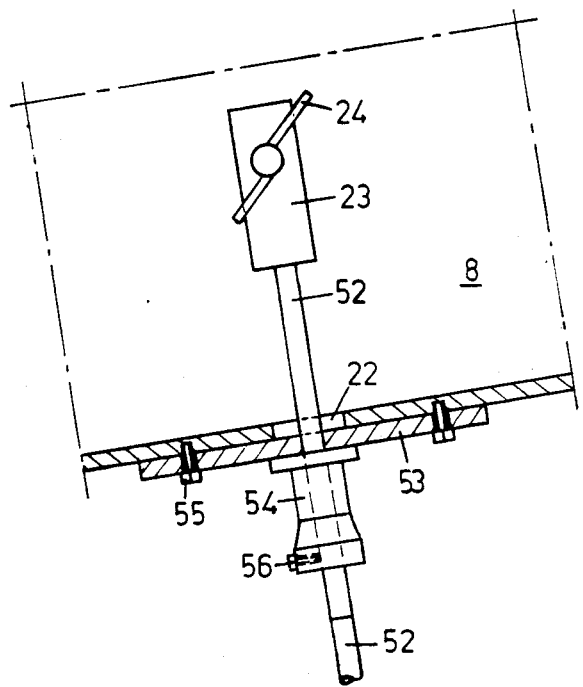
FIG. 6 shows a lengthwise section similar to the one in FIGS. 2 and 3, but pertaining to a third portion of the device for cleaning according to the invention, which portion is shown as mounted on the evaporator bottom during the cleaning of the lowermost space of said evaporator.

For cleaning the lowermost space 8, use is finally made of said revolving tank washing head 23,24, and spraying is performed with the same pressure as when cleaning the uppermost space 5. In FIG. 6, use is however made of another lance 52 and another lead-through for said lance 52 through the access 22 the cover 21 of which has first been removed.

The lance 52 has a diameter of thirty millimeters and it is comprised of various parts of thirty centimeters which are screwable on one another.

In FIG. 6, lead-through or passageway for lance 52 is comprised of a mounting flange 53 whereon is secured a bush 54. The flange 53 is secured by bolts 55 in lieu of the cover 21, with a portion of lance 52 through the bush 54, and the head 23,24 inside space 8. As the lance 52 extends more deeply, additional lengthwise sections are screwed-on, which is possible in spite of how little place there is underneath the vessel bottom, due to the limited length of said sections. With the desired position of head 23,24, the lance 52 is made fast in bush 54 by means of a bolt 56. To the lance 52 is connected the supply line and water is sprayed with a pressure between 35 and 50 MPa and preferably of 40 MPa. Such operation is repeated in various positions of the spray head 23,24, until the complete space 8 is cleaned, whereby between the sprayings, the lance 52 is shifted along the lengthwise axis thereof outwards, and sections are unscrewed from the lance as required.

During each one of the above-described cleanings, the used water is collected at the bottom of vessel 1, and it is pumped by means of a diaphragm pump away through outlet 20 and line 19. The end of line 19 removed from the evaporator has been previously uncoupled and connected to a filter unit which retains particles down to 0.5 μm. After filtering, the water is fed to a supply tank from which said water is pumped with a high-pressure pump for the spraying.

The above-described method allows a very efficient and safe cleaning of the evaporator. Said method is particularly suitable for cleaning an evaporator of a nuclear power station. Such an evaporator may not be cleaned by means of chemicals due to the contamination danger.

The invention is in no way limited to the above-described embodiment and within the scope of the patent application, many changes may be brought to the described embodiment, notably as regards the shape, the composition, the arrangement and the number of the components being used for embodying the invention.

I claim:

1. A method for cleaning with high pressure an evaporator of the type which comprises:
   an upstanding round closed vessel,
   at least two substantially horizontal perforated partitions which divide said vessel into an uppermost space, at least one middle space, and a lowermost space,
   a supply line for the liquid to be evaporated which line opens on the uppermost space,
   an access to said uppermost space which access is provided in the vessel wall and is closable with a cover,
   an access to said middle space which access is provided in the vessel wall and is closable with a cover,
   a discharge line for the vapour and liquid, which line opens on the lowermost space,
   an outlet which is provided in the vessel bottom, and
   an access to said lowermost space which access is provided in the vessel botom and is closable with a cover, which method comprises first cleaning the uppermost space, then the middle space, and finally the lower most space, whereby
   (a) for cleaning the uppermost space,
   the cover of the access to said space is removed,
   through said access a high-pressure lance which is equipped with a spray head comprising a body rotatable about the lance axis and spray arms rotatably mounted on said body,
   the spray head is successively brought in different locations in the uppermost space, said locations being spaced vertically and horizontally, and
   at least each time the spray head is held in a fixed location, liquid is sprayed with a pressure lying between 35 and 50 MPa, causing thereby a rotation of the body of the head and of the spray arms;
   (b) for cleaning the middle space,
   the cover of the access of said space is removed,
   through said access a high-pressure lance which is equipped with a fixed spray head provided with spray openings in various directions,
   liquid is sprayed with a pressure lying between 50 and 70 MPa through the spray head in said space, and
   during the spraying the spray head is moved to-and-fro substantially horizontally in the lance axis direction;
   (c) for cleaning the lowermost space,
   the cover of the access to said space is removed,
   a high-pressure lance equipped with a spray head similar to said spray head provided cleaning the uppermost space, is brought through said access in the lowermost space, while insuring that the access is sealed leak-free around the lance,
   the spray head is successively brought in different locations in the lowermost space, and
   at least each time the spray head is held in a fixed location liquid with a pressure lying between 35 and 50 MPa is sprayed through the spray head, causing thereby a rotation of the body of the head and of the spray arms; and
   (d) during the cleaning of each one of said spaces, the cleaning liquid is collected at the bottom of said vessel and discharged through the outlet in the bottom.

2. The method as defined in claim 1, wherein the evaporator comprises three substantially horizontal perforated partitions and consequently two middle spaces, and both said middle spaces are cleaned in the same way as defined in step (b), starting with the upper one of the two middle spaces.

3. The method as defined in claim 1, in which there is cleaned an evaporator which comprises inside the uppermost space of the vessel, a filter and a partition lying underneath the supply line, said partition closes the space around the filter and which has a removable part, and said removable part is removed before cleaning the uppermost space.

4. The method as defined in claim 1, in which the middle space to be cleaned is cleaned in various steps, whereby in each step one portion is cleaned, and during the cleaning of said portion, the spray head is moved to an-fro over a limited distance to cover completely said portion.

5. The method as defined in claim 1, in which for cleaning the uppermost space, the high-pressure lance is adjustably mounted in a ball fitting which can be made fast and which is mounted opposite the access to the uppermost space on the vessel, so that the high-pressure lance can both be moved in the direction of the longitudinal axis of the lance and changed in direction, and between successive fixed locations of the spray head, said lance is shifted or changed in direction.

6. The method as defined in claim 1, in which for cleaning the middle space, use is made of a fixed spray head which is equipped with six sets of six substantially tangentially-bored holes with a diameter of 0.8 mm.

7. The method as defined in claim 1, in which for cleaning the lowermost space the high pressure lance with the spray head is shifted along the longitudinal axis between two sprayings in a fixed location of the spray head.

8. A method for cleaning an evaporator of the type which comprises:
   an upstanding closed vessel,
   at least two substantially horizontal perforated partitions which divide said vessel into an uppermost space, a middle space, and a lowermost space,
   an access to said uppermost space, which access is provided in the vessel wall and is closable with a cover,
   an access to said middle space, which access is provided in the vessel wall and is closable with a cover, and
   an access to said lowermost space, which access is provided in the vessel bottom and is closable with a cover, which method comprises sequentially cleaning the uppermost space, then the middle space, and finally the lowermost space, whereby said method includes the following steps:

(a) for cleaning the uppermost space, removing the cover of the access to said space, inserting through said access a high-pressure lance having at the end thereof a spray head comprising a body rotatable about the lance axis and spray arms rotatably mounted on said body, successively moving the spray head in different locations in the uppermost space, said locations being spaced vertically and horizontally, and at least each time the spray head is held in a fixed location, spraying liquid with a pressure between 35 and 50 MPa, causing thereby a rotation of the body of the head and of the spray arms;

(b) for cleaning the middle space, removing the cover of the access of said space, inserting through said access a high-pressure lance having at the end thereof a fixed spray head provided with spray openings directed in various directions, spraying liquid with a pressure lying between 50 and 70 MPa through the spray head in said space, and during the spraying, moving the spray head to-and-fro substantially horizontally in the lance axis direction; and (c) for cleaning the lowermost space, removing the cover of the access to said space, inserting through said access in the lowermost space a high-pressure lance having on the end thereof a spray head similar to the one having been used for cleaning the uppermost space, while insuring that the access is sealed leak-free around the lance, successively bringing the spray head in different locations in the lower most space, and at least each time the spray head is held in a fixed location, spraying liquid with a pressure lying between 35 and 50 MPa through the spray head, causing thereby a rotation of the body of the head and of the spray arms; and, (d) during the cleaning of each one of said spaces, collecting the cleaning liquid at the bottom of the vessel and discharging the cleaning liquid through an outlet in the bottom of the vessel.

* * * * *